United States Patent
Hagen et al.

(10) Patent No.: US 9,965,315 B1
(45) Date of Patent: May 8, 2018

(54) MULTI-CORE GUEST OPERATING SYSTEM LOADING APPROACH

(71) Applicant: Rockwell Collins, Inc., Cedar Rapids, IA (US)

(72) Inventors: John L. Hagen, Marion, IA (US); David J. Radack, Robins, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 140 days.

(21) Appl. No.: 15/185,336

(22) Filed: Jun. 17, 2016

(51) Int. Cl.
| | |
|---|---|
| G06F 9/455 | (2006.01) |
| G06F 9/46 | (2006.01) |
| G06F 9/00 | (2006.01) |
| G06F 12/00 | (2006.01) |
| G06F 9/445 | (2018.01) |
| G06F 9/44 | (2018.01) |

(52) U.S. Cl.
CPC .......... *G06F 9/45558* (2013.01); *G06F 9/445* (2013.01); *G06F 9/4406* (2013.01); *G06F 2009/45562* (2013.01)

(58) Field of Classification Search
None
See application file for complete search history.

(56) References Cited

U.S. PATENT DOCUMENTS

| | | | | |
|---|---|---|---|---|
| 7,610,481 | B2 * | 10/2009 | Cool | G06F 9/4401 710/38 |
| 8,082,431 | B2 | 12/2011 | Rothman et al. | |
| 8,112,621 | B2 * | 2/2012 | Sato | G06F 15/161 711/114 |

OTHER PUBLICATIONS

VanderLesest et al; A Safe & Secure ARINC 653 Hypervisor; IEEE, 2013.*

* cited by examiner

*Primary Examiner* — Bing Zhao
(74) *Attorney, Agent, or Firm* — Angel N. Gerdzhikov; Donna P. Suchy; Daniel M. Barbieri (57) ABSTRACT

A system and related method for guest OS loading in a multi-core processing environment optimizes the startup process by loading a hypervisor runtime image to an allocated memory location, from which the processing cores individually activate and execute the runtime image rather than reloading the runtime image. For guest operating systems executing across multiple processing cores, a single core may load the associated guest OS image to allocated memory space in the system RAM. The remaining cores on which that guest OS is configured to execute may then copy the loaded guest OS image to their own respective allocated system RAM, and execute the copied guest OS images therefrom.

20 Claims, 8 Drawing Sheets

224 — Executing the at least one loaded third runtime image via the at least one third processing core 226 — Copying, via the one or more fourth processing cores, the at least one loaded third runtime image from the at least one fourth memory region into one or more fifth memory regions of the system memory, the one or more fifth memory regions corresponding to the one or more fourth processing cores 228 — Executing the at least one copied third runtime image via the one or more fourth processing cores

FIG. 2D

MULTI-CORE GUEST OPERATING SYSTEM LOADING APPROACH

BACKGROUND

Safety-critical avionics processing systems make increasing use of multi-core processors with embedded hypervisors. The use of a multi-core processing environment allows for the simultaneous hosting of multiple guest operating systems (GOS) across multiple cores. However, the number and size of GOS images required by simultaneous hosting may complicate the startup timing requirements of certified avionics processing systems. For example, with respect to a cold start (wherein avionics equipment is booted or powered up after a period of nonuse) instruments powered by a safety-critical system must be operational within 10 to 20 seconds. However, under warm-start conditions involving, e.g., a reboot or restart inflight, safety-critical sensors or display systems must resume normal operations immediately (e.g., within a second or a fraction thereof). It may be desirable to optimize the startup timing of a multi-core, multiple-GOS processing environment by simplifying the initial loading and execution of runtime images.

SUMMARY

In one aspect, embodiments of the inventive concepts disclosed herein are directed to a system for GOS loading in a multi-core processing environment (MCPE). The MCPE may include a series of processing cores and a hypervisor for managing virtual machines executing on the processing cores. The system may include at least one GOS running on one or more of the processing cores. The system may include a system RAM wherein memory regions are allocated to the hypervisor and to each of the series of processing cores. The system may include a flash memory containing runtime images for the hypervisor and the GOS. A default core of the series of processor cores may load the hypervisor runtime image into the system RAM allocated to the hypervisor and execute the hypervisor runtime image. The default core may map the loaded hypervisor runtime image to each remaining processor core and activate the remaining cores. The remaining cores may execute the hypervisor runtime image. The default core may load the GOS runtime image from the flash memory to the system RAM allocated to the default core and execute the GOS runtime image. Each of the remaining cores may copy the GOS runtime image to their respective allocated system RAM and execute the copies of the GOS runtime image.

In a further aspect, embodiments of the inventive concepts disclosed herein are directed to an MCPE. The MCPE may include a series of processing cores and a hypervisor for managing virtual machines executing on the processing cores. The system may include at least one GOS running on one or more of the processing cores. The system may include a system RAM wherein memory regions are allocated to the hypervisor and to each of the series of processing cores. The system may include a flash memory containing runtime images for the hypervisor and the GOS. A default core of the series of processor cores may load the hypervisor runtime image into the system RAM allocated to the hypervisor and execute the hypervisor runtime image. The default core may map the loaded hypervisor runtime image to each remaining processor core and activate the remaining cores. The remaining cores may execute the hypervisor runtime image. The default core may load the GOS runtime image from the flash memory to the system RAM allocated to the default core and execute the GOS runtime image. Each of the remaining cores may copy the GOS runtime image to their respective allocated system RAM and execute the copies of the GOS runtime image.

In a still further aspect, embodiments of the inventive concepts disclosed herein are directed to a method for multi-core GOS loading. The method may include loading, via a first processing core of an MCPE, a hypervisor runtime image from a flash memory unit to a memory region of the MCPE system RAM allocated to the hypervisor of the MCPE. The method may include executing the loaded hypervisor runtime image via the first core. The method may include mapping, via the first core, the loaded hypervisor runtime image to each additional processing core of the MCPE. The method may include executing the loaded hypervisor runtime image via the additional cores, based on the mapping. The method may include loading, via the first core, a GOS runtime image from the flash memory into a memory region of the system RAM allocated to the first core. The method may include executing the loaded GOS image via the first core. The method may include copying, via each additional core running a particular GOS, the appropriate GOS runtime image from the memory region allocated to the first core to memory regions allocated to each of the additional cores. The method may include executing the copied GOS images via the additional cores.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to a system and related methods for managing the loading of guest operating systems (GOS) by a multi-core processing environment (MCPE, also multi-core processing resource (MCPR)) of an avionics processing system. The system leverages the faster, and more rapidly accelerating, speeds of system RAM as opposed to physical storage. By replicating loaded GOS images to multiple cores, the system can more quickly load multiple GOS across multiple processing cores. Safety-critical avionics systems incorporating multi-core, multiple-GOS processing environments may thereby accommodate additional processing cores (and thus increased processing power) while guaranteeing compliance with timing requirements.

Figure 1A:
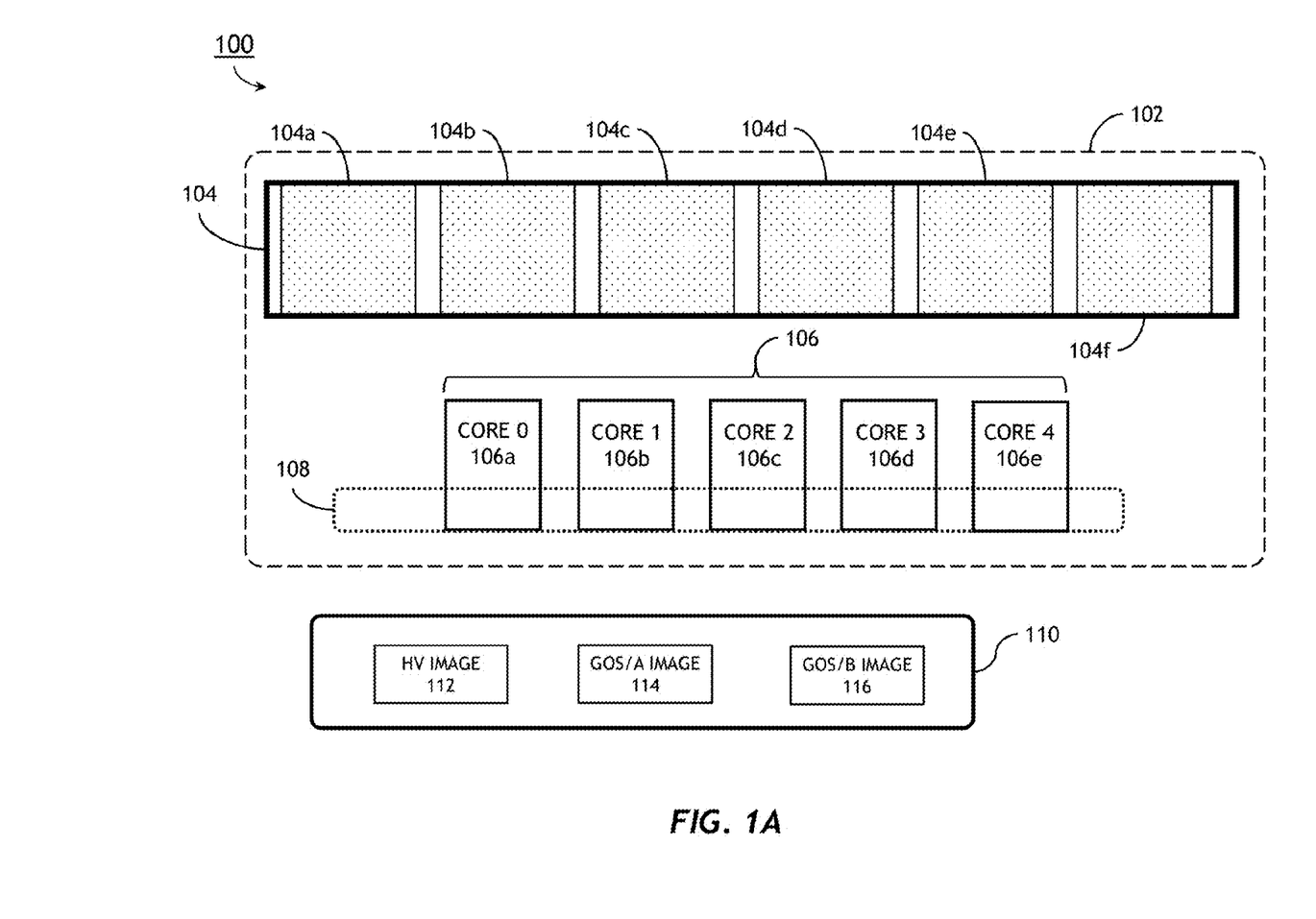
FIG. 1A is a block diagram illustrating an exemplary embodiment of a system according to the inventive concepts disclosed herein.

Referring to FIG. 1A, an exemplary embodiment of a system 100 for multi-core GOS loading according to the inventive concepts disclosed herein may include a MCPE 102 incorporating a system RAM 104 and one or more processing cores 106. The system 100 may be embodied in an ARINC 653 compatible avionics processing system. The MCPE 102 may incorporate a hypervisor 108 for managing virtual machines, partitions, and health monitors executing on each of the processing cores 106. The system 100 may include a non-volatile storage medium (NVSM) 110 or similar solid-state memory unit, e.g., NOR flash memory. The NVSM 110 may store images for activating the processing cores 106 and any GOS executing on the processing cores. For example, the NVSM 110 may store a hypervisor (HV) runtime image 112 including instructions and private core data, such as configuration data. The NVSM 110 may also store GOS runtime images 114, 116 for loading a GOS onto a processing core 106 (e.g., during cold or warm starts). The NVSM 110 may store multiple GOS runtime images 114, 116 if, for example, the MCPE 102 is configured to run more than one GOS simultaneously across its configuration of processor cores 106. For example, the MCPE 102 may include five processing cores 106 and be configured to run one GOS on processing cores 0, 1, and 2 (106a-c) and a second GOS on processing cores 3 and 4 (106d-e). The system RAM 104 may further allocate memory to the hypervisor 108 (104a) as well as to the virtual machines executing on each processing core 106, 106a-d (104b-f).

Figure 1B:
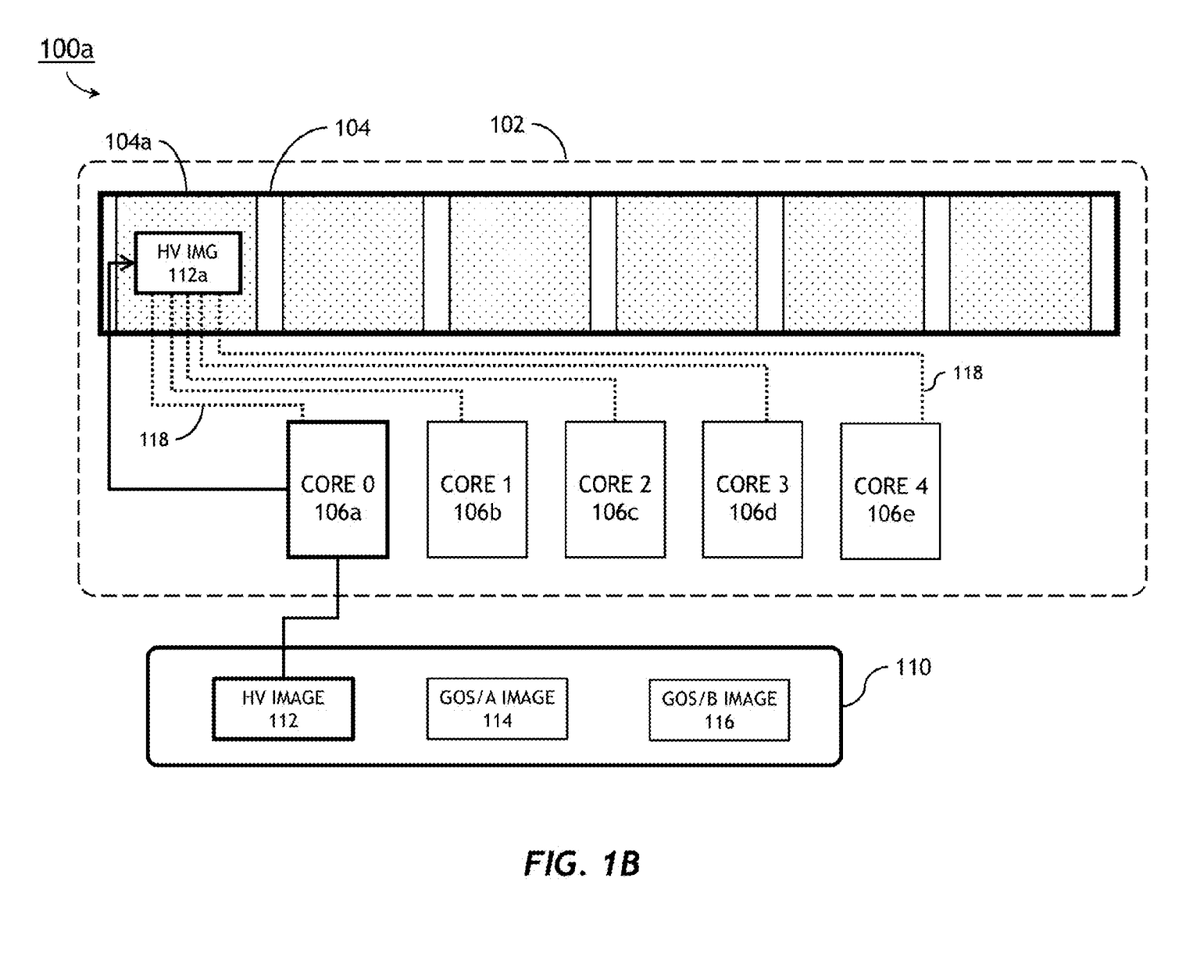
FIGS. 1B through 1D are block diagrams illustrating exemplary embodiments of a GOS loading operation of the system of FIG. 1A.

Referring to FIG. 1B, a system 100a may be implemented and may function similarly to the system 100 of FIG. 1A, except that in the system 100a, a processing core 106a of the MCPE 102 may load (112a) the HV runtime image 112 from the NVSM 110 into the system RAM allocated (104a) to the hypervisor 108. The processing core 106a may execute the loaded HV runtime image 112a. The processing core 106a may map (118) the loaded HV runtime image 112a to each of the other processing cores 106b-e, e.g., via one or more pointers to the allocated system RAM 104a, and activate the remaining processing cores 106b-e subsequent to the mapping. The remaining processing cores 106b-e may also execute the loaded HV runtime image 112a from its allocated memory region (104a) in the system RAM 104.

Figure 1C:
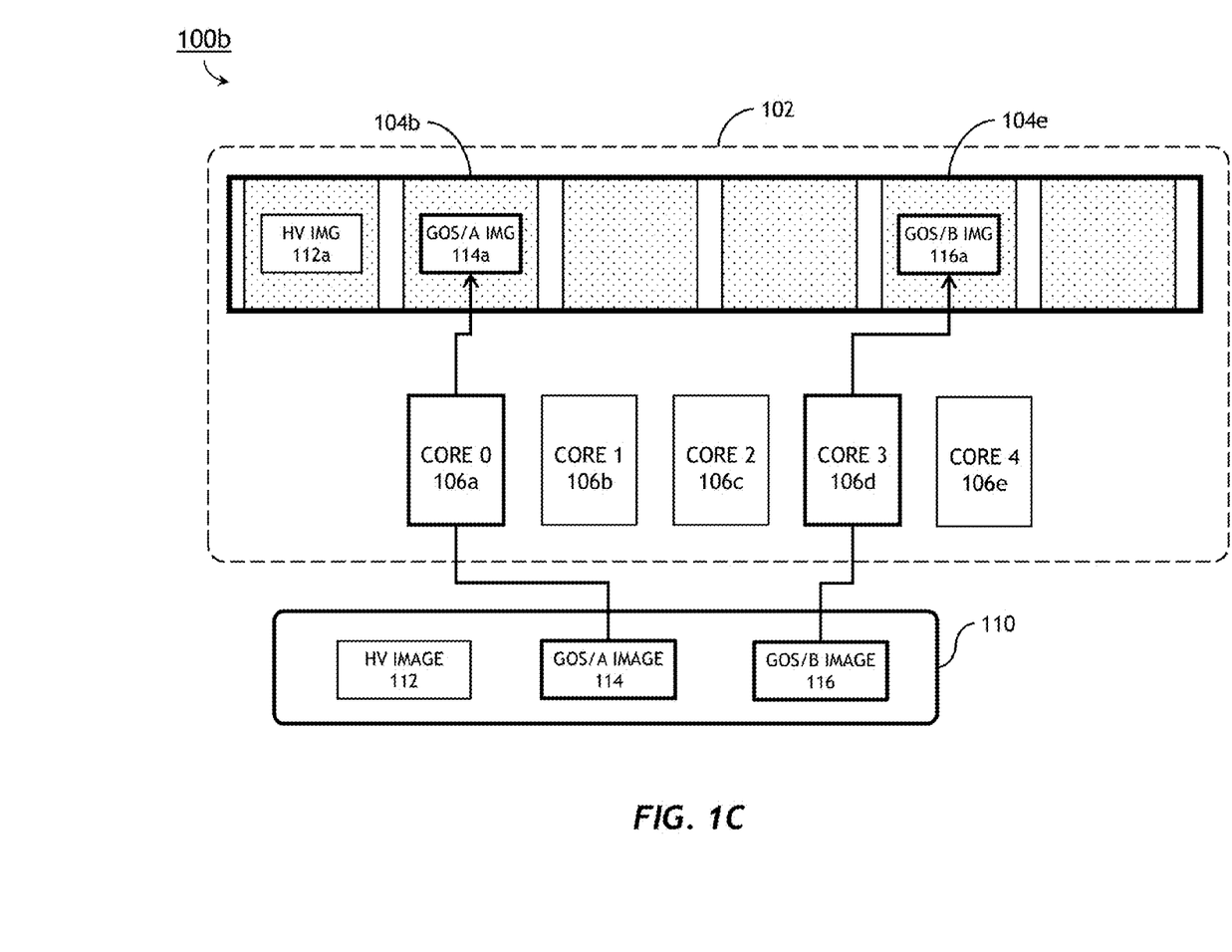

Referring to FIG. 1C, a system 100b may be implemented and may function similarly to the system 100a of FIG. 1B, except that in the system 100b, the processing cores 106a-e of the MCPE 102 may individually load the appropriate GOS runtime image (114, 116) depending on the configuration data in the HV runtime image 112a. For example, a first GOS may be configured to execute on processing cores 0, 1, 2 (106a-c) and a second GOS may be configured to execute on processing cores 3 and 4 (106d-e). Processing core 0 (106a) may load (114a) the GOS runtime image 114 from the NVSM 110 into the system RAM allocated (104b) to the processing core 106a. Similarly, processing core 3 (106d) may load (116a) the GOS runtime image 116 from the NVSM 110 into the system RAM allocated (104e) to the processing core 106d. The processing cores 0 and 3 (106a, 106d) may execute the respective loaded GOS runtime images 114a, 116a from their respective allocated system RAM (104b, 104e).

Figure 1D:
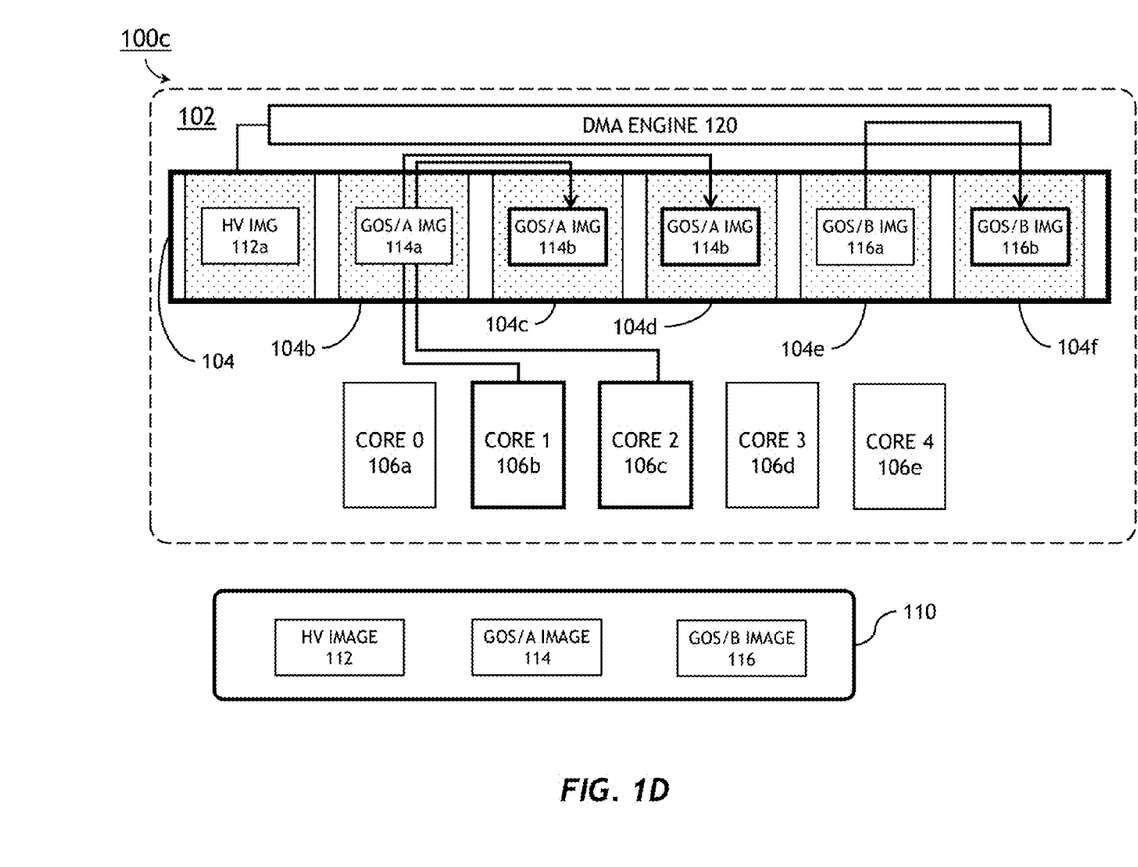

Referring to FIG. 1D, a system 100c may be implemented and may function similarly to the system 100b of FIG. 1C, except that in the system 100c, the processing cores 1 and 2 (106b-c) may independently copy (114b) to their respective allocated system RAM (104c-d) the GOS runtime image 114a loaded to the system RAM allocated (104b) to the processing core 0 (106a). Similarly, the processing core 4 (106e) may copy (116b) to its allocated system RAM (104f) the GOS runtime image 116a loaded to the system RAM allocated (104e) to the processing core 3 (106d). The processing cores 1 and 2 (106b-c) may execute the copied GOS runtime images 114b, and the processing core 4 (106e) may execute the copied GOS runtime image 116b. The MCPE 102 may include a Direct Memory Access (DMA) engine 120 connected to the system memory 104. For example, the copying (116b) of a loaded GOS runtime image 116a to the system RAM 104f allocated to processing core 4 (106e) may be more efficiently implemented by the DMA engine 120.

Figure 2A:
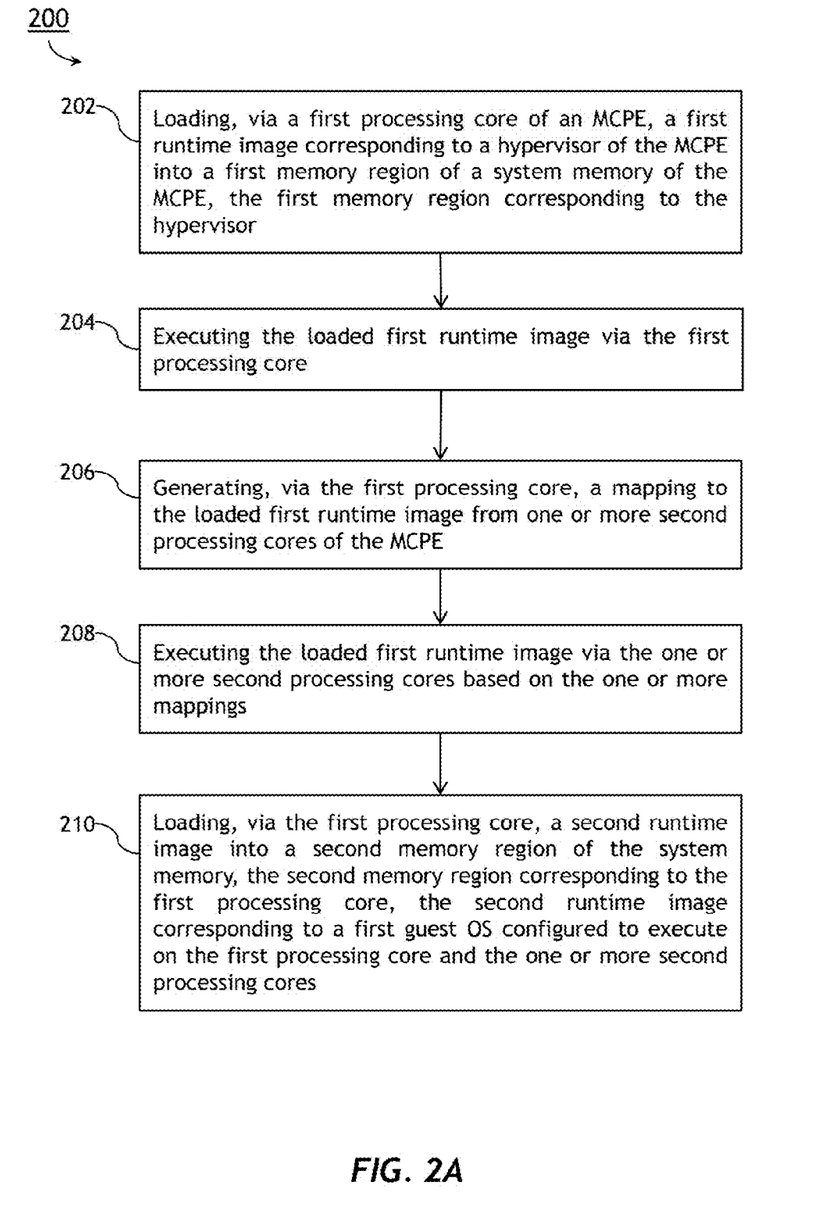
FIGS. 2A through 2D are process flow diagrams illustrating an exemplary embodiment of a method for GOS loading according to the inventive concepts disclosed herein.
Figure 2B:
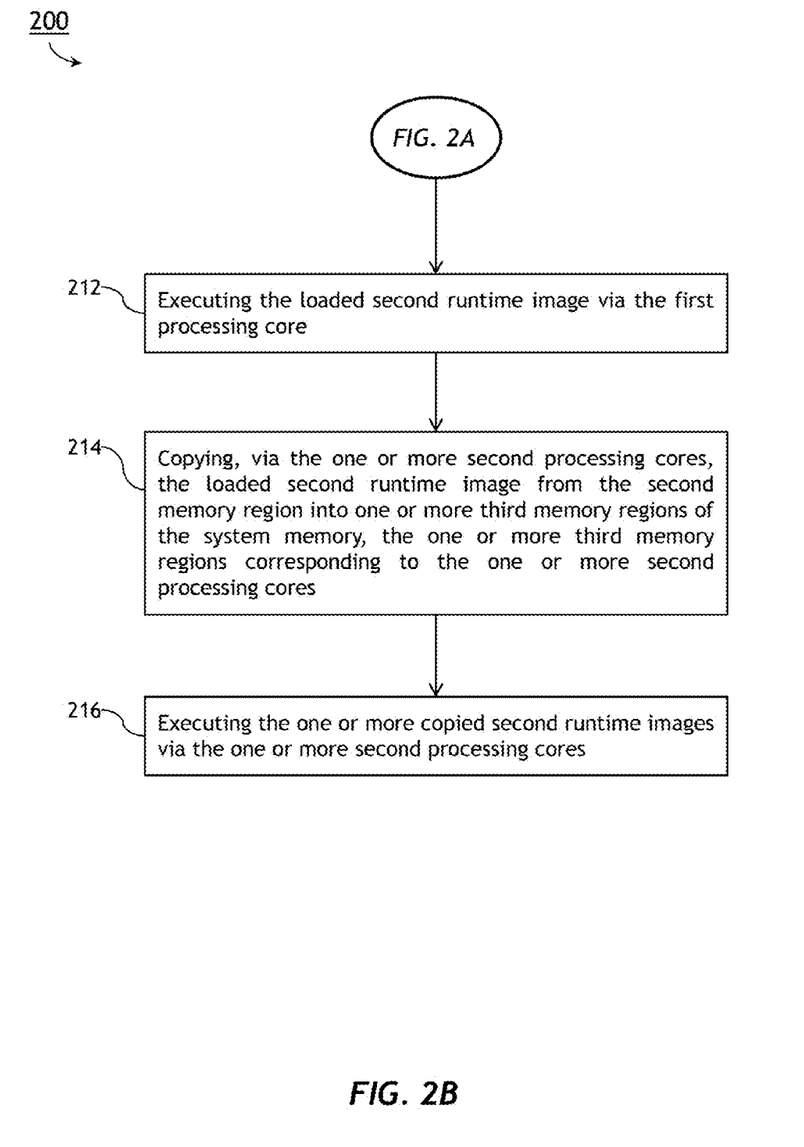

Referring now to FIGS. 2A and 2B, an exemplary embodiment of a method 200 for multi-core GOS loading according to the inventive concepts disclosed herein may be implemented by the system 100 in some embodiments, and may include one or more of the following steps. Referring particularly to FIG. 2A, at a step 202, a first processing core of an MCPE may load an HV runtime image into a region of the system RAM of the MCPE allocated to the hypervisor.

At a step 204, the first processing core executes the loaded HV runtime image.

At a step 206, the first processing core maps the loaded HV runtime image to the remaining processing cores of the MCPE. The first processing core may activate the remaining processing cores after mapping.

At a step 208, the remaining cores execute the loaded HV runtime image.

At a step 210, the first processing core loads a GOS runtime image into the system RAM allocated to the first processing core; the GOS runtime image may correspond to the GOS configured to execute on the first processing core and at least some of the remaining processing cores.

Referring particularly to FIG. 2B, at a step 212, the first processing core executes the loaded GOS runtime image.

At a step 214, each of the remaining processing cores on which the GOS associated with the loaded GOS runtime image is configured to execute copies the loaded GOS runtime image into the system RAM respectively allocated to each remaining processing core. The copying of the loaded GOS runtime image may be implemented by a DMA engine of the MCPE.

At a step 216, the remaining processing cores execute their respective copied GOS runtime images.

Figure 2C:
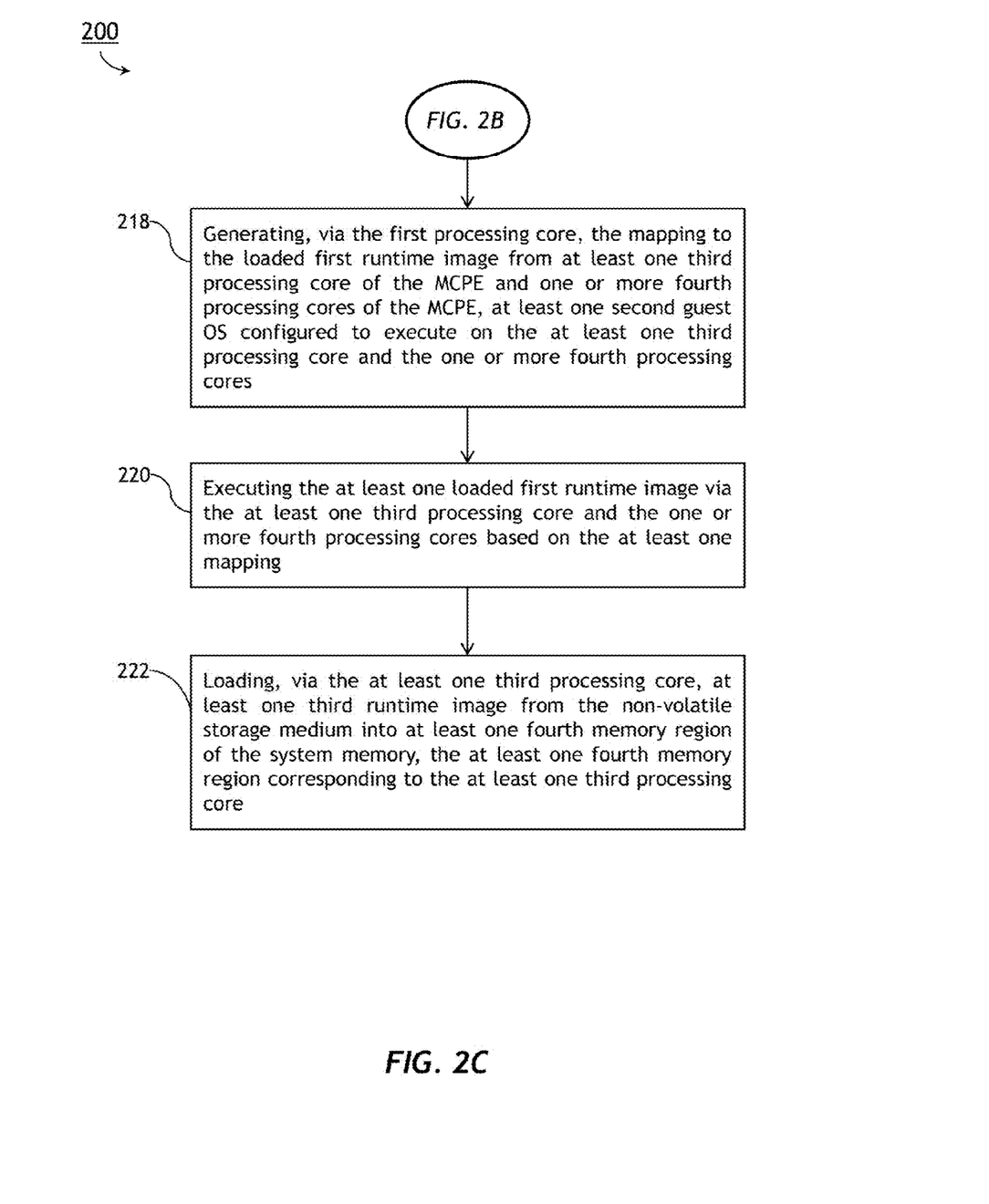
Figure 2D:
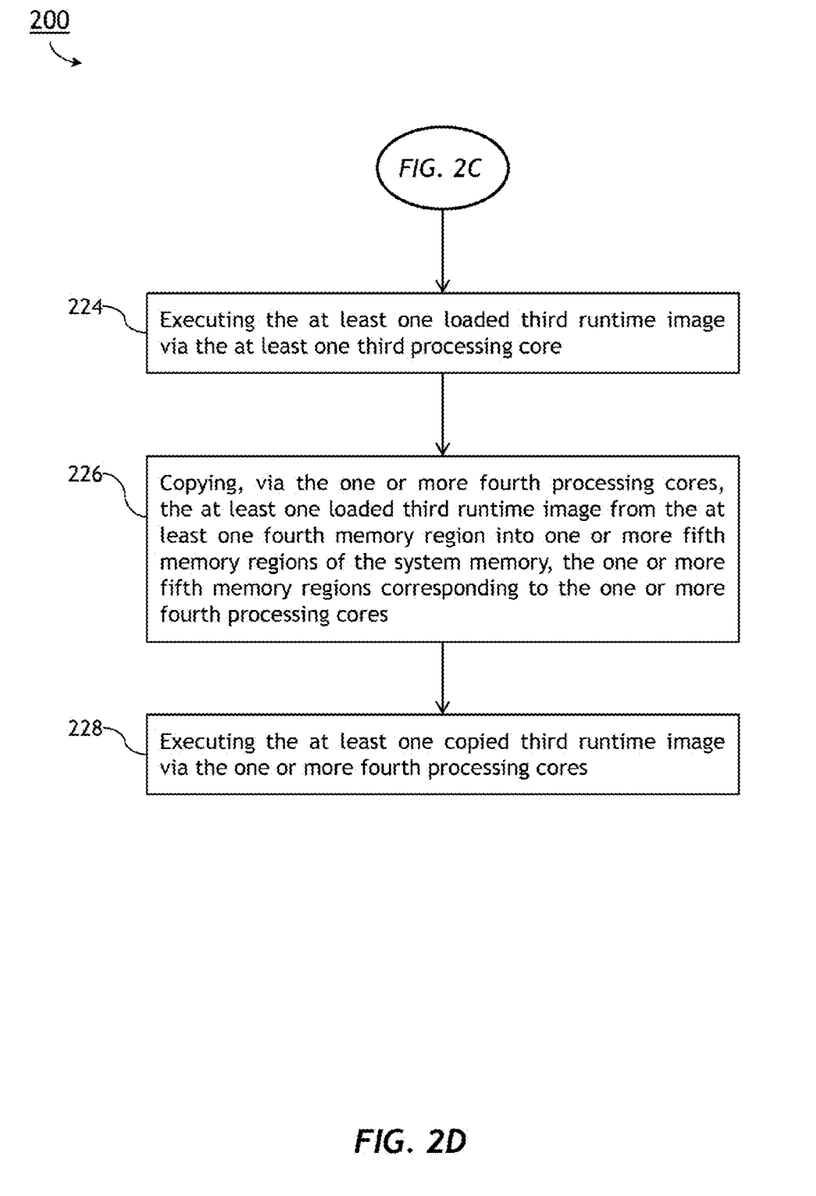

Referring to FIGS. 2C and 2D, the method 200 may include additional steps 218 through 228. Referring particularly to FIG. 2C, at the step 218, the first processing core maps the loaded HV runtime image to further processing cores on which a second GOS may be configured to execute. The first processing core may activate the further processing cores after mapping.

At a step 220, the further processing cores execute the loaded HV runtime image based on the mapping by the first processing core.

At a step 222, a selected processing core of the further processing cores loads a second GOS runtime image (corresponding to the second GOS) to its respective allocated memory in the system RAM.

Referring particularly to FIG. 2D, at a step 224, the selected processing core executes the loaded second GOS runtime image.

At a step 226, the remaining further processing cores (on which the second GOS is configured to execute) each copy the loaded second GOS runtime image into their respective memory allocations in the system RAM. The copying of the loaded second GOS runtime image may be implemented by the DMA engine.

At the step 228, the remaining further processing cores execute their respective copied second GOS runtime images.

As will be appreciated from the above, systems and methods according to embodiments of the inventive concepts disclosed herein may optimize the startup process by minimizing the loading of identical runtime images from slower solid-state data storage and promoting instead the much faster copying of identical runtime images from system RAM.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A system for multi-core guest operating system (GOS) loading, comprising:
  a multi-core processing environment (MCPE) having a first processing core, at least one second processing core, and a hypervisor associated with the first processing core and the at least one second processing core;
  a first GOS configured to execute on the first processing core and the at least one second processing core;
  a system memory including a first memory region corresponding to the hypervisor, a second memory region corresponding to the first processing core, and at least one third memory region corresponding to the at least one second processing core; and
  a non-volatile storage medium coupled to the MCPE and including at least one first runtime image corresponding to the hypervisor and at least one second runtime image corresponding to the first GOS;
  the first processing core configured to:
    load the at least one first runtime image into the first memory region;
    execute the at least one loaded first runtime image;
    generate at least one mapping from the at least one second processing core to the at least one loaded first runtime image;
    load the at least one second runtime image to the second memory region; and
    execute the at least one loaded second runtime image;
  the at least one second processing core configured to:
    execute the at least one loaded first runtime image based on the at least one mapping;
    copy the at least one second runtime image from the second memory region to the at least one third memory region; and
    execute the at least one copied second runtime image.

2. The system of claim 1, wherein the non-volatile storage medium includes a flash memory unit.

3. The system of claim 1, wherein the first processing core is configured to activate the at least one second processing core after generating the at least one mapping.

4. The system of claim 1, wherein:
  the MCPE includes at least one third processing core and one or more fourth processing cores, at least one second GOS configured to execute on the at least one third processing core and the one or more fourth processing cores;
  the system memory includes at least one fourth memory region corresponding to the at least one third processing core and one or more fifth memory regions corresponding to the one or more fourth processing cores; and the non-volatile storage medium includes at least one third runtime image corresponding to the at least one second GOS;

the first processing core is configured to generate the at least one mapping from the at least one third processing core and the one or more fourth processing cores to the at least one loaded first runtime image;

the at least one third processing core is configured to:
execute the at least one loaded first runtime image based on the at least one mapping;
load the at least one third runtime image to the at least one fourth memory region; and
execute the at least one loaded third runtime image; and the one or more fourth processing cores are configured to:
execute the at least one loaded first runtime image based on the at least one mapping;
copy the at least one third runtime image from the at least one fourth memory region to the one or more fifth memory regions; and
execute the at least one copied third runtime image.

5. The system of claim 4, wherein the first processing core is configured to activate the at least one third processing core and the one or more fourth processing cores after generating the at least one mapping.

6. The system of claim 1, wherein the MCPE includes at least one direct memory access (DMA) engine coupled to the system memory, the at least one DMA engine configured to:
copy the at least one second runtime image from the second memory region to the at least one third memory region; and
copy the at least one third runtime image from the at least one fourth memory region to the one or more fifth memory regions.

7. The system of claim 1, wherein the system is embodied in an ARINC 653 compliant avionics processing system.

8. A multi-core processing environment (MCPE), comprising:
at least a first processing core and at least one second processing core, at least one first guest operating system (OS) configured to execute on the first processing core and the at least one second processing core;
a hypervisor coupled to the first processing core and the at least one second processing core;
a system memory coupled to the first processing core and the at least one second processing core, the system memory including at least a first memory region corresponding to the hypervisor, a second memory region corresponding to the first processing core, and at least one third memory region corresponding to the at least one second processing core;
the first processing core configured to:
load at least one first runtime image from a non-volatile storage medium coupled to the MCPE into the first memory region, the at least one first runtime image corresponding to the hypervisor;
execute the at least one loaded first runtime image;
generate at least one mapping from the at least one second processing core to the at least one loaded first runtime image;
load at least one second runtime image from the non-volatile storage medium to the at least one second memory region, the at least one second runtime image corresponding to the at least one first GOS; and
execute the at least one loaded second runtime image;

the at least one second processing core configured to:
execute the at least one loaded first runtime image based on the at least one mapping;
copy the at least one second runtime image from the second memory region to the one or more third memory regions; and
execute the at least one copied second runtime image.

9. The MCPE of claim 8, wherein the non-volatile storage medium includes a flash memory unit.

10. The MCPE of claim 8, wherein the first processing core is configured to activate the at least one second processing core after generating the at least one mapping.

11. The MCPE of claim 8, further comprising at least one third processing core and one or more fourth processing cores, at least one second GOS configured to execute on the at least one third processing core and the one or more fourth processing cores, wherein:
the system memory includes at least one fourth memory region and one or more fifth memory regions, the at least one fourth memory region corresponding to the at least one third processing core and the one or more fifth memory regions corresponding to the one or more fourth processing cores;

the non-volatile storage medium includes at least one third runtime image corresponding to the at least one second GOS;

the first processing core is configured to generate the at least one mapping from the at least one third processing core and the one or more fourth processing cores to the at least one loaded first runtime image;

the at least one third processing core is configured to:
execute the at least one loaded first runtime image based on the at least one mapping;
load the at least one third runtime image to the at least one fourth memory region; and
execute the at least one loaded third runtime image; and the one or more fourth processing cores are configured to:
execute the at least one loaded first runtime image based on the at least one mapping;
copy the at least one third runtime image from the at least one fourth memory region to the one or more fifth memory regions; and
execute the at least one copied third runtime image.

12. The MCPE of claim 11, wherein the first processing core is configured to activate the at least one third processing core and the one or more fourth processing cores after generating the at least one mapping.

13. The MCPE of claim 8, further comprising at least one direct memory access (DMA) engine coupled to the system memory, the at least one DMA engine configured to:
copy the at least one second runtime image from the second memory region to the at least one third memory region; and
copy the at least one third runtime image from the at least one fourth memory region to the one or more fifth memory regions.

14. The MCPE of claim 8, wherein the MCPE is embodied in an ARINC 653 compliant avionics processing system.

15. A method for loading guest operating systems (OS) of a multi-core processing environment (MCPE), the method comprising:
loading, via a first processing core of an MCPE, at least one first runtime image from a non-volatile storage medium coupled to the MCPE into a first memory region of a system memory of the MCPE, the at least one first runtime image and the first memory region corresponding to a hypervisor of the MCPE;

executing the at least one loaded first runtime image via the first processing core;

generating, via the first processing core, a mapping to the at least one loaded first runtime image from one or more second processing cores of the MCPE;

executing the at least one loaded first runtime image via the one or more second processing cores based on the one or more mappings;

loading, via the first processing core, at least one second runtime image from the non-volatile storage medium into a second memory region of the system memory, the second memory region corresponding to the first processing core, the at least one second runtime image corresponding to a first GOS configured to execute on the first processing core and the one or more second processing cores;

executing the at least one loaded second runtime image via the first processing core;

copying, via the one or more second processing cores, the at least one loaded second runtime image from the second memory region into one or more third memory regions of the system memory, the one or more third memory regions corresponding to the one or more second processing cores; and executing the one or more copied second runtime images via the one or more second processing cores.

16. The method of claim 15, wherein generating, via the first processing core, a mapping to the at least one loaded first runtime image from one or more second processing cores of the MCPE includes:

activating the one or more second processing cores via the first processing core.

17. The method of claim 15, wherein copying, via the one or more second processing cores, the at least one loaded second runtime image from the second memory region into one or more third memory regions of the system memory, the one or more third memory regions corresponding to the one or more second processing cores includes:

copying, via a direct memory access (DMA) engine of the MCPE, the at least one loaded second runtime image from the second memory region into one or more third memory regions of the system memory, the one or more third memory regions corresponding to the one or more second processing cores.

18. The method of claim 15, further comprising:

generating, via the first processing core, the mapping to the at least one loaded first runtime image from at least one third processing core of the MCPE and one or more fourth processing cores of the MCPE, at least one second GOS configured to execute on the at least one third processing core and the one or more fourth processing cores;

executing the at least one loaded first runtime image via the at least one third processing core and the one or more fourth processing cores based on the at least one mapping;

loading, via the at least one third processing core, at least one third runtime image from the non-volatile storage medium into at least one fourth memory region of the system memory, the at least one fourth memory region corresponding to the at least one third processing core and the at least one third runtime image corresponding to the at least one second GOS;

executing the at least one loaded third runtime image via the at least one third processing core;

copying, via the one or more fourth processing cores, the at least one loaded third runtime image from the at least one fourth memory region into one or more fifth memory regions of the system memory, the one or more fifth memory regions corresponding to the one or more fourth processing cores; and executing the at least one copied third runtime image via the one or more fourth processing cores.

19. The method of claim 18, wherein generating, via the first processing core, the mapping to the at least one loaded first runtime image from at least one third processing core of the MCPE and one or more fourth processing cores of the MCPE, at least one second GOS configured to execute on the at least one third processing core and the one or more fourth processing cores includes:

activating, via the first processing core, the at least one third processing core and the one or more fourth processing cores.

20. The method of claim 18, wherein copying, via the one or more fourth processing cores, the at least one loaded third runtime image from the at least one fourth memory region into one or more fifth memory regions of the system memory, the one or more fifth memory regions corresponding to the one or more fourth processing cores includes:

copying, via a DMA engine of the MCPE, the at least one loaded third runtime image from the at least one fourth memory region into one or more fifth memory regions of the system memory, the one or more fifth memory regions corresponding to the one or more fourth processing cores.

* * * * *